United States Patent
Yoon et al.

(10) Patent No.: US 9,601,275 B1
(45) Date of Patent: *Mar. 21, 2017

(54) DIELECTRIC CERAMIC COMPOSITION AND ELECTRONIC DEVICE USING THE SAME

(71) Applicant: SAMSUNG ELECTRO-MECHANICS CO., LTD., Suwon-si, Gyeonggi-Do (KR)

(72) Inventors: Seok-Hyun Yoon, Gimpo (KR); Yun-Jung Park, Daejeon (KR); Doo-Young Kim, Seongnam (KR); Song-Je Jeon, Jinju (KR); Chang-Hun Kim, Suwon (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,481

(22) Filed: Oct. 28, 2015

(51) Int. Cl.
*C04B 35/468* (2006.01)
*H01G 4/12* (2006.01)

(52) U.S. Cl.
CPC ....... *H01G 4/1227* (2013.01); *C04B 35/4682* (2013.01)

(58) Field of Classification Search
CPC .. C04B 35/468; C04B 35/4682; H01G 4/1227
See application file for complete search history.

(56) References Cited

U.S. PATENT DOCUMENTS

| | | | |
|---|---|---|---|
| 7,973,456 B2 * | 7/2011 | Tanaka | C04B 35/4682 310/358 |
| 8,014,126 B2 * | 9/2011 | Sato | B82Y 30/00 361/306.1 |
| 2009/0236943 A1 * | 9/2009 | Tanaka | C04B 35/4682 310/358 |
| 2013/0083449 A1 * | 4/2013 | Yoon | C04B 35/4682 361/321.4 |
| 2014/0313634 A1 * | 10/2014 | Yoon | H01G 4/1227 361/301.4 |
| 2016/0163457 A1 * | 6/2016 | Yoon | H01G 4/1227 361/301.4 |

FOREIGN PATENT DOCUMENTS

| | | | |
|---|---|---|---|
| JP | 2013063874 | * | 4/2013 |
| JP | 2013063876 | * | 4/2013 |
| KN | 1020100042567 | * | 4/2010 |

* cited by examiner

*Primary Examiner* — Karl Group
(74) *Attorney, Agent, or Firm* — McDermott Will & Emery LLP

(57) ABSTRACT

A dielectric ceramic composition includes a main component comprising $(1-x)BaTiO_3\text{-}x(Na_{1-y}K_y)NbO_3$, where $0.005 \leq x \leq 0.5$ and $0.3 \leq y \leq 1.0$; a first subcomponent comprising an element selected from the group consisting of Mn, V, Cr, Fe, Ni, Co, Cu and Zn; and a second subcomponent comprising $SiO_2$.

19 Claims, No Drawings

DIELECTRIC CERAMIC COMPOSITION AND ELECTRONIC DEVICE USING THE SAME

CROSS REFERENCE TO RELATED APPLICATION

This application claims the benefit of priority to Korean Patent Application No. 10-2014-0164758, filed on Nov. 24, 2014, entitled "Dielectric ceramic composition and electric device using the same", which is hereby incorporated by reference in its entirety.

TECHNICAL FIELD

The present disclosure relates to a dielectric ceramic composition and an electric device using the same and, more particularly, to a dielectric ceramic composition and an electric device using the same which satisfies the X5R, X7R, and X8R properties specified in the EIA standard.

BACKGROUND

A composition system of dielectric materials of a high capacitance BME multi-layered ceramic capacitor such as conventional X5R, X7R or X8R, etc. necessarily comprises a main component of $BaTiO_3$ or $(Ba_{1-x}Ca_x)(Ti_{1-y}Ca_y)O_3$ and additive subcomponents of about 4 kinds or more. The largest percentage of these additive subcomponents is a fixed-valence acceptor, such as Mg and rare-earth elements. Variable-valence acceptors may be included in a lesser amount and sintering aid(s) may also be included to increase sinterability. In these conventional composition systems, rare-earth elements and fixed-valence acceptors, such as Mg, generally react with $BaTiO_3$ to form a core-shell structure which is needed to obtain desired properties of a normal multi-layered ceramic capacitor. $CaZrO_3$ may be added to a main component of $BaTiO_3$ in order to increase the Curie temperature or an excess amount of rare-earth elements may be added to a main component of $BaTiO_3$ in order to alleviate a reduced degree of permittivity at the Curie temperature or higher.

SUMMARY

One aspect of the present disclosure provides a dielectric ceramic composition which satisfies the X5R, X7R, and X8R properties specified in the Electronic Industries Alliance (EIA) standard and can be sintered using nickel as an internal electrode at 1300° C. or less under reduced atmosphere in which the nickel is not oxidized, and an electric device using the dielectric ceramic composition.

The present disclosure provides a sintered compound that may be formed by mixing or forming a solid solution of $BaTiO_3$ and $(Na, K)NbO_3$ in an appropriate ratio and adding a small amount of $SiO_2$ and $MnO_2$ which can maintain high permittivity of 1500 or more at room temperature and provide X8R thermal properties.

The present disclosure provides a dielectric ceramic composition comprising a main component comprising $(1-x)BaTiO_3\text{-}x(Na_{1-y}K_y)NbO_3$, where $0.005 \leq x \leq 0.5$ and $0.3 \leq y \leq 1.0$; a first subcomponent comprising an element selected from the group consisting of Mn, V, Cr, Fe, Ni, Co, Cu and Zn; and a second subcomponent comprising $SiO_2$.

The first subcomponent may be an oxide or a carbonate of an element selected from the group consisting of Mn, V, Cr, Fe, Ni, Co, Cu and Zn. In certain embodiments, the first subcomponent may be $MnO_2$ or $MnCO_3$.

The content of the first subcomponent in the dielectric ceramic composition may be 0.1-5.0 atomic percent.

The content of $SiO_2$ in the second subcomponent may be 0.1-5.0 atomic percent.

An electrical device may comprise the dielectric ceramic composition.

The electrical device may be one selected from the group consisting of a multi-layered ceramic capacitor, a piezoelectric element, a chip inductor, a chip varistor, a chip resistor, and a positive temperature coefficient resistor (PTCR).

A dielectric ceramic composition may comprise $(1-x)BaTiO_3\text{-}x(Na_{1-y}K_y)NbO_3$, where $0.005 \leq x \leq 0.5$ and $0.3 \leq y \leq 1.0$, having a room temperature permittivity of 1500 or more, a temperature coefficient of capacitance at 150° C. between −15% and +15%, and a withstand voltage at 150° C. of 50 V/μm or more.

The room temperature permittivity may be 2000 or more.

The temperature coefficient of capacitance at 150° C. may be between −10% and +10%.

The withstand voltage at 150° C. may be 60 V/μm or more.

According to the present disclosure, properties such as an increase in the Curie temperature and stabilized permittivity at a high temperature can be provided without adding Pb, which is harmful to the environment, to a parent material. In addition, the present disclosure provides for X8R thermal property and voltage-proof properties.

DESCRIPTION OF THE EXEMPLARY EMBODIMENTS

Hereinafter, the present inventive concept will be explained in more detail.

The present disclosure relates to a dielectric ceramic composition which provides thermal properties up to 150° C. and satisfies X8R properties for reliability.

$BaTiO_3$ may form the main component of high capacitance Ni-MLCC (multi-layer ceramic capacitor) having a Curie temperature ($T_C$) of about 125° C. The permittivity of $BaTiO_3$ drops sharply above this temperature. Thus, there is a demand for developing a composition having thermal properties up to 150° C. to be within ±15% of the X8R standard.

For example, it has been reported in JP Patent Publication Nos. 2002-255639 and 2005-263508 that addition of an excess amount of rare-earth elements to $BaTiO_3$ alleviates the extent of the decrease of the permittivity at temperatures higher than the Curie temperature, or appropriate amounts of $CaZrO_3$ to $BaTiO_3$ may be added to increase the Curie temperature so that the temperature coefficient of capacitance (TCC) at a high temperature can be improved. However, Yoon et al., J. Mater. Res., 22[9]2539 (2007) discloses that when an excess amount of rare-earth elements is used, a second phase of pyrochlore is generated to deteriorate the reliability. Furthermore, when an excess amount of rare-earth elements is added or $CaZrO_3$ is added to $BaTiO_3$, which has a Curie temperature of 125° C., it may satisfy X8R properties but may not be enough to obtain TCC properties at a high temperature.

Alternatively, powder having a high Curie temperature may be used to improve TCC properties at a high temperature. When Ca is used as the A-cation of the $ABO_3$ Perovskite structure, the Curie temperature increases and the Ca-added $BaTiO_3$ (BCT) powder increases the TCC properties at a high temperature. Thus, this material may be used as an X8R material, as has been reported in Yoon et al., J. Mater. Res., 25[11]2135 (2010). When $BaTiO_3$ is prepared by calcination in the air using the solid state method, Pb has also been known to increase the Curie temperature in addition to Ca. However, Pb is a noxious material, and it may volatilize easily during the sintering process under the reduced atmosphere like that used to prepare a Ni-multi-layered ceramic capacitor.

Accordingly, the present disclosure provides a dielectric ceramic composition which is able to exhibit the permittivity of 1500 or above and excellent insulation resistance and X8R thermal properties after being prepared as a sintered compound through mixing $BaTiO_3$ and (Na, K)$NbO_3$ in an appropriate ratio or forming a solid solution thereof, adding a small amount of $SiO_2$ and $MnO_2$ and sintering the mixture. Thus, even though $CaZrO_3$ or an excess amount of rare-earth elements is not added, it provides X8R properties and better TCC properties at a high temperature, compared to the conventional $BaTiO_3$.

According to an aspect of the present inventive concept, a dielectric ceramic composition comprises a main component of $(1-x)BaTiO_3\text{-}x(Na_{1-y}K_y)NbO_3 (0.005 \le x \le 0.5, 0.3 \le y \le 1.0)$ which is a solid solution of a first main component $BaTiO_3$ and a second main component $(Na_{1-y}K_y)NbO_3$, a first subcomponent comprising an element selected from the group consisting of Mn, V, Cr, Fe, Ni, Co, Cu and Zn, and a second subcomponent comprising $SiO_2$ or a glass-forming material comprising $SiO_2$.

The range of x and y is based on the composition and experimental results in Table 1 and Table 2 according to examples of the present inventive concept.

The dielectric ceramic composition comprises a main component prepared by mixing a first main component $BaTiO_3$ and a second main component (Na, K)$NbO_3$, and additives comprising an oxide or a carbonate of a variable-valence acceptor as a first subcomponent and $SiO_2$ as a second subcomponent. The prepared main component may be powder with a particle size of 1.0 µm or less.

In an embodiment, the first subcomponent may be an oxide or a carbonate of an element selected from the group consisting of Mn, V, Cr, Fe, Ni, Co, Cu and Zn. In certain embodiments, the first subcomponent may be $MnO_2$ or $MnCO_3$.

In an embodiment, the content of the first subcomponent in the dielectric ceramic composition may be 0.1-5.0 at %.

In an embodiment, the content of $SiO_2$ in the second subcomponent may be 0.1-5.0 at %.

Exemplary ranges of each component are shown in the results in Table 1 and Table 2.

According to another aspect of the present inventive concept, an electrical device comprises a dielectric material prepared by using the dielectric ceramic composition.

In certain embodiments, the electrical device may be at least one selected from the group consisting of a multi-layered ceramic capacitor, a piezoelectric element, a chip inductor, a chip varistor, a chip resistor and a positive temperature coefficient resistor (PTCR).

In particular, the dielectric ceramic composition of the present inventive concept may be used for multilayer dielectric material products and internal electrode layers, for example, products in which Ni internal electrode layers and dielectric material layers are alternatively laminated. Since the dielectric material layer having a very thin thickness adversely affects the reliability due to lower numbers of crystal grains existing within the layer, the thickness of a dielectric material layer may be 0.1 µm or above after sintering.

EXAMPLES

A mixed solid solution powder of $(1-x)BaTiO_3\text{-}x(Na_{1-y}K_y)NbO_3$, which forms the main powder, was prepared using the solid state method. Starting materials were $BaCO_3$, $TiO_2$, $Na_2O$, $K_2O$, and $Nb_2O_5$. $BaCO_3$ and $TiO_2$ were mixed with a ball mill and calcinated at 900-1000° C. to provide $BaTiO_3$ powder having an average particle size of 300 nm. Similarly, $Na_2O$, $K_2O$, and $Nb_2O_5$ were mixed with a ball mill and calcinated at 800-900° C. to provide $(Na_{0.5}K_{0.5})NbO_3$ powder having an average particle size of 300 nm. All main components in the composition shown in Table 1 were dispersed and mixed in ethanol. The mixture was calcined at 950-1050° C. in the air to provide a main powder having an average particle size of 300 nm. Subcomponents $MnO_2$ and $SiO_2$ powder in the composition shown in Table 1 were added to the main powder. The main powder including main components and subcomponents was mixed and dispersed with a zirconia ball in ethanol/toluene and then a dispersing agent and a binder were added thereto and the mixture was ball-milled for 2 hours. The prepared slurry was used to prepare a molded sheet using a doctor blade type coater.

A Ni internal electrode was printed on the prepared cast sheet. Top and bottom covers were prepared by laminating cover sheets with 25 layers and 21 printed dielectric active sheets were laminated and pressed to provide a bar. The bar was cut into chips of 3.2 mm×1.6 mm size by a cutter. The 3216-sized multi-layered ceramic capacitor (MLCC) chip was baked-out and sintered in the reducing atmosphere of 0.1% $H_2$/99.9% $N_2$ ($H_2O/H_2/N_2$ atmosphere) at 1200-1300° C. for 2 hours, and then heat-treated at 1000° C. under $N_2$ atmosphere for 3 hours. The sintered chip was prepared with Cu paste for a termination process and an electrode sintering process to provide an external electrode.

TABLE 1

| | Mole ratio of each main component $(1-x)BaTiO_3 + x(Na_{1-y}K_y)NbO_3$:$(1-x)$BT-xNKN | | | Mole of each additive per 100 mole $(1-x)$BT-xNKN main component | |
|---|---|---|---|---|---|
| | 1st main component | 2nd main component | | 1st subcom- | 2nd subcom- |
| Example | $BaTiO_3$ (1 − x) | $(Na_{1-y}K_y)NbO_3$ (x) | y | ponent $MnO_2$ | ponent $SiO_2$ |
| 1 | 1.000 | 0.000 | 0.500 | 0.50 | 0.50 |
| 2 | 0.995 | 0.005 | 0.500 | 0.50 | 0.50 |
| 3 | 0.990 | 0.010 | 0.500 | 0.50 | 0.50 |
| 4 | 0.980 | 0.020 | 0.500 | 0.50 | 0.50 |
| 5 | 0.970 | 0.030 | 0.500 | 0.50 | 0.50 |
| 6 | 0.950 | 0.050 | 0.500 | 0.50 | 0.50 |
| 7 | 0.900 | 0.100 | 0.500 | 0.50 | 0.50 |
| 8 | 0.800 | 0.200 | 0.500 | 0.50 | 0.50 |
| 9 | 0.700 | 0.300 | 0.500 | 0.50 | 0.50 |
| 10 | 0.600 | 0.400 | 0.500 | 0.50 | 0.50 |
| 11 | 0.500 | 0.500 | 0.500 | 0.50 | 0.50 |
| 12 | 0.400 | 0.600 | 0.500 | 0.50 | 0.50 |
| 13 | 0.950 | 0.050 | 0.500 | 0.00 | 0.50 |
| 14 | 0.950 | 0.050 | 0.500 | 0.10 | 0.50 |
| 15 | 0.950 | 0.050 | 0.500 | 0.30 | 0.50 |
| 16 | 0.950 | 0.050 | 0.500 | 1.00 | 0.50 |
| 17 | 0.950 | 0.050 | 0.500 | 2.00 | 0.50 |
| 18 | 0.950 | 0.050 | 0.500 | 5.00 | 0.50 |
| 19 | 0.950 | 0.050 | 0.500 | 7.00 | 0.50 |
| 20 | 0.950 | 0.050 | 0.500 | 0.50 | 0.00 |
| 21 | 0.950 | 0.050 | 0.500 | 0.50 | 0.10 |
| 22 | 0.950 | 0.050 | 0.500 | 0.50 | 1.00 |
| 23 | 0.950 | 0.050 | 0.500 | 0.50 | 2.00 |
| 24 | 0.950 | 0.050 | 0.500 | 0.50 | 5.00 |
| 25 | 0.950 | 0.050 | 0.500 | 0.00 | 7.00 |
| 26 | 0.950 | 0.050 | 0.200 | 0.50 | 0.50 |

TABLE 1-continued

| | Mole ratio of each main component $(1-x)BaTiO_3 + x(Na_{1-y}K_y)NbO_3:(1-x)BT-xNKN$ | | | Mole of each additive per 100 mole $(1-x)BT-xNKN$ main component | |
|---|---|---|---|---|---|
| Example | 1st main component $BaTiO_3$ $(1-x)$ | 2nd main component $(Na_{1-y}K_y)NbO_3$ $(x)$ | y | 1st subcomponent $MnO_2$ | 2nd subcomponent $SiO_2$ |
| 27 | 0.950 | 0.050 | 0.300 | 0.50 | 0.50 |
| 28 | 0.950 | 0.050 | 0.700 | 0.50 | 0.50 |
| 29 | 0.950 | 0.050 | 1.000 | 0.50 | 0.50 |

As shown in Table 2, the prototype multi-layered ceramic capacitor samples were measured to determine capacitance, DF, insulation resistance, TCC, resistance degradation with voltage-step up at 150° C. RT (room temperature) electrostatic capacitance and dielectric loss of the multi-layered ceramic capacitor chip were determined under conditions of 1 kHz, AC 0.2 V/μm by using a LCR meter. Permittivity of the dielectric material of the multi-layered ceramic capacitor chip was calculated from the electrostatic capacitance, dielectric material thickness, internal electrode area, and number of layers of the multi-layered ceramic capacitor chip.

Samples each were taken and RT insulation resistance (IR) was determined after 60 seconds while DC 10 V/μm was applied to the samples. Changes in electrostatic capacitance with temperature were determined from −55° C. to 150° C.

High-temperature IR step-up tests were performed at 150° C. with increasing voltage step by 5 V/μm to determine the resistance degradation. The duration for each step was 10 min and resistance was determined every 5 seconds. High-temperature withstand voltages were obtained from the high-temperature IR step-up test. To determine high-temperature withstand voltage, an increasing voltage step of DC 5 V/μm at 150° C. for 10 minutes was applied to a 3216 size chip of the 20-layered dielectric material having 7 μm thickness after sintering. The high-temperature withstand voltage is a voltage for IR to withstand $10^5\Omega$ or above.

Table 2 shows properties of prototype multi-layered ceramic capacitor chips corresponding to the compositions in Table 1.

TABLE 2

Electrical properties of the proto-type MLCC samples
(permittivity/DF measurement condition: AC 0.2 V/um, 1 kHz)
(Resistivity measurement condition at room temperature: DC 10 V/um)

| Exam. | Sintering temperature (° C.) | RT permittivity | DF(%) | RT specific resistance (Ohm-cm) | TCC(%) (−55° C.) | TCC(%) (125° C.) | TCC(%) (150° C.) | Temp (150° C.) withstand voltage(V/um)* | Result |
|---|---|---|---|---|---|---|---|---|---|
| 1 | 1250.0 | 3156.0 | 3.520 | 8.221E+12 | −11.7% | −12.4% | −35.2% | 70 | X |
| 2 | 1250.0 | 2766.0 | 3.685 | 8.564E+12 | −12.2% | −11.2% | −15.0% | 70 | ○ |
| 3 | 1250.0 | 2751.0 | 3.580 | 8.623E+12 | −12.4% | −10.4% | −14.5% | 70 | ○ |
| 4 | 1250.0 | 2548.0 | 3.470 | 9.630E+12 | −12.5% | −9.5% | −13.5% | 75 | ○ |
| 5 | 1250.0 | 2477.0 | 3.410 | 1.023E+13 | −12.8% | −9.1% | −12.8% | 70 | ○ |
| 6 | 1250.0 | 2348.0 | 3.260 | 1.174E+13 | −13.2% | −8.8% | −11.8% | 65 | ○ |
| 7 | 1250.0 | 2247.0 | 3.100 | 1.210E+13 | −13.4% | −8.5% | −10.6% | 65 | ○ |
| 8 | 1250.0 | 2197.0 | 2.980 | 1.256E+13 | −13.5% | −8.8% | −10.2% | 65 | ○ |
| 9 | 1250.0 | 1948.0 | 2.840 | 1.326E+13 | −9.5% | −6.2% | −9.8% | 5 | ○ |
| 10 | 1250.0 | 1757.0 | 2.640 | 1.335E+13 | −9.2% | −5.8% | −9.6% | 0 | ○ |
| 11 | 1250.0 | 1548.0 | 2.480 | 1.458E+13 | −8.8% | −5.6% | −9.5% | 5 | ○ |
| 12 | 1250.0 | 1284.0 | 1.820 | 4.568E+13 | −7.8% | −5.1% | −9.2% | 5 | X |
| 13 | 1250.0 | 21868.0 | 126.500 | 8.480E+07 | — | — | — | 5 | X |
| 14 | 1250.0 | 2568.0 | 4.280 | 5.120E+11 | −13.1% | −9.5% | −12.5% | 50 | ○ |
| 15 | 1250.0 | 2437.0 | 4.020 | 7.480E+12 | −12.9% | −9.4% | −11.7% | 55 | ○ |
| 16 | 1250.0 | 2296.0 | 2.350 | 8.308E+12 | 12.8% | 2.4% | −9.8% | 65 | ○ |
| 17 | 1250.0 | 1868.0 | 2.260 | 6.335E+11 | −11.6% | −2.3% | −8.5% | 65 | ○ |
| 18 | 1250.0 | 1567.0 | 2.170 | 2.407E+11 | −11.2% | −2.1% | −8.4% | 60 | ○ |
| 19 | 1250.0 | 1365.0 | 1.930 | 7.408E+10 | −10.4% | −1.9% | −7.7% | 55 | X |
| 20 | 1300.0 | 2532.0 | 3.990 | 5.688E+12 | −13.7% | −7.9% | −10.1% | 45 | X |
| 21 | 1270.0 | 2417.0 | 3.840 | 6.408E+12 | −13.6% | −7.8% | −11.5% | 55 | ○ |
| 22 | 240.0 | 2323.0 | 3.120 | 1.245E+13 | −12.8% | −8.4% | −11.7% | 60 | ○ |
| 23 | 1250.0 | 2284.0 | 2.990 | 1.070E+13 | −11.8% | −8.6% | −12.2% | 55 | ○ |
| 24 | 1270.0 | 2187.0 | 2.970 | 1.123E+13 | −11.7% | −7.4% | −11.7% | 50 | ○ |
| 25 | 1290.0 | 2048.0 | 2.880 | 8.887E+12 | −11.4% | −7.6% | −11.6% | 40 | X |
| 26 | 1250.0 | 1645.0 | 2.830 | 6.208E+12 | −11.8% | −12.5% | −9.9% | 35 | X |
| 27 | 1250.0 | 1948.0 | 3.030 | 8.450E+12 | 12.3% | −11.1% | −12.7% | 55 | ○ |
| 28 | 1250.0 | 2046.0 | 1.870 | 8.550E+12 | −10.7% | −10.5% | −15.0% | 55 | ○ |
| 29 | 1250.0 | 1852.0 | 1.8 | 9.523E+12 | −9.7% | −6.2% | −9.9% | 50 | ○ |

Wherein, "X" refers to unqualified, "○" refers to qualified.

y=0.5 in the second main component $(Na_{1-y}K_y)NbO_3$ and the content of the first subcomponent $MnO_2$ and the second subcomponent $SiO_2$ are 0.5 at % and 0.5 at %, respectively, based on the main powder $(1-x)BaTiO_3-x(Na_{1-y}K_y)NbO_3$ in Examples 1-12, according to Table 1. Properties of the prototype chip according to the content of BT of the first main component, 1-x, and the content of $(Na_{1-y}K_y)NbO_3$ of the second main component, x, are listed in Table 2. As the x content increases from 0 (Example 1) to 0.6 (Example 12), the permittivity gradually decreases. When the x content is 0 (Example 1), the permittivity is 3156 which is very high but TCC (150° C.) deviates from ±15% range of the X8R standard as −35.2%. On the other hand, when the x content is 0.6 (Example 12), the RT permittivity rapidly decreases to less than 1500.

Samples of Examples 2-11 have the RT permittivity of 1500 or above and high-temperature withstand voltage of 50 V/μm or above, and satisfy TCC (150° C.) of ≤±15% of the X8R thermal property. Thus, an appropriate x range may be 0.005≤x≤0.5.

y=0.5 in the second main component $(Na_{1-y}K_y)NbO_3$, the content x of $(Na_{1-y}K_y)NbO_3$ is 0.05, and $SiO_2$ content of the second subcomponent is 0.5 at %, based on the main powder $(1-x)BaTiO_3-x(Na_{1-y}K_y)NbO_3$ in Examples 13-19 according to Table 1. Properties of the prototype chip with the $MnO_2$ content of the first subcomponent are listed in Table 2. When the content of Mn is 0 (Example 13), the RT specific resistance is 8.480E7 which is very low, while when the content of Mn is 0.1 or above (Example 14), it shows insulation properties of 1E11 or above. As the content of Mn increases, the permittivity and the RT specific resistance continuously decrease so that when the content of Mn increases to 7 at % (Example 19), the permittivity decreases to 1365 which is below 1500 and the RT specific resistance decreases to less than 1E11.

Samples of Example 14-18 show desired properties of the permittivity, the high-temperature withstand voltage, and TCC properties so that the content of Mn may be 0.1-5.0 at %.

y=0.5 in the second main component $(Na_{1-y}K_y)NbO_3$, the content x of $(Na_{1-y}K_y)NbO_3$ is 0.05, and $MnO_2$ content of the first subcomponent is 0.5 at %, based on the main powder $(1-x)BaTiO_3-x(Na_{1-y}K_y)NbO_3$ in Examples 20-25 according to Table 1. Properties of the prototype chip with the $SiO_2$ content of the second subcomponent are listed in Table 2. When the content of $SiO_2$ is 0 (Example 20), the sintering temperature increases to about 1300° C., while as the content of $SiO_2$ increases (Examples 21-24), the sinterability is improved. When the content of $SiO_2$ is 7 at % (Example 25), there is no improvement in the sinterability anymore and the high-temperature withstand voltage is deteriorated to less than 50 V/μm. According to the results of the permittivity, the high-temperature withstand voltage, TCC properties, and the sinterability from Examples 20-25, the content of $SiO_2$ may be 0.1-5.0 at %.

x=0.05 in the second main component $(Na_{1-y}K_y)NbO_3$ and the content of the first subcomponent $MnO_2$ and the second subcomponent $SiO_2$ are 0.5 at % and 0.5 at %, respectively, based on the main powder $(1-x)BaTiO_3-x(Na_{1-y}K_y)NbO_3$ in Examples 26-29, according to Table 1. Properties of the prototype chip according to K content, y, and Na content, 1-y, of the second main component $(Na_{1-y}K_y)NbO_3$ are listed in Table 2. When the K content, y, in the second main component $(Na_{1-y}K_y)NbO_3$ is decreased from 0.3 (Example 27) to 0.2 (Example 26) (from 0.5), the permittivity decreases and the high temperature voltage proof property is deteriorated. When y=0.2 (Example 26), the high-temperature withstand voltage becomes less than 50 V/μm. On the other hand, when the K content, y, is increased from 0.7 (Example 28) to 1.0 (Example 29) (from 0.5), the permittivity and the high-temperature withstand voltage are somewhat decreased but the permittivity, the high-temperature withstand voltage, and the TCC properties satisfy the target properties of the present inventive concept. According to the results of the permittivity, the high-temperature withstand voltage, and the RT specific resistance from Examples 26-29, the K content y may be 0.3≤y≤1.0.

The present inventive concept relates to a dielectric ceramic composition and an electrical device using the same and, more particularly, to a dielectric ceramic composition and an electrical device using the same which satisfies X5R, X7R, and X8R properties specified in the EIA standard. According to the present inventive concept, properties such as an increase in the Curie temperature and permittivity at a high temperature can be provided without adding Pb, which is harmful to the environment, to a parent material. In addition, X8R thermal property and voltage proof property may be satisfied.

The spirit of the present inventive concept has been described by way of example hereinabove, and the present inventive concept may be variously modified, altered, and substituted by those skilled in the art to which the present inventive concept pertains without departing from essential features of the present inventive concept. Accordingly, the exemplary embodiments disclosed in the present inventive concept and the accompanying drawings do not limit but describe the spirit of the present inventive concept, and the scope of the present inventive concept is not limited by the exemplary embodiments and accompanying drawings. The scope of the present inventive concept should be interpreted by the following claims and it should be interpreted that all spirits equivalent to the following claims fall within the scope of the present inventive concept.

What is claimed is:

1. A dielectric ceramic composition comprising:
   a main component comprising $(1-x)BaTiO_3-x(Na_{1-y}K_y)NbO_3$, where 0.03≤x≤0.5 and 0.3≤y≤0.7;
   a first subcomponent comprising an element selected from the group consisting of Mn, V, Cr, Fe, Ni, Co, Cu and Zn; and
   a second subcomponent comprising $SiO_2$.

2. The dielectric ceramic composition of claim 1, wherein the first subcomponent is an oxide or a carbonate of an element selected from the group consisting of Mn, V, Cr, Fe, Ni, Co, Cu and Zn.

3. The dielectric ceramic composition of claim 1, wherein the first subcomponent is $MnO_2$ or $MnCO_3$.

4. The dielectric ceramic composition of claim 1, wherein the content of the first subcomponent in the dielectric ceramic composition is 0.1-5.0 atomic percent.

5. The dielectric ceramic composition of claim 1, wherein the content of $SiO_2$ in the second subcomponent is 0.1-5.0 atomic percent.

6. An electrical device comprising the dielectric ceramic composition of claim 1.

7. The electrical device of claim 6, wherein the electrical device is one selected from the group consisting of a multi-layered ceramic capacitor, a piezoelectric element, a chip inductor, a chip varistor, a chip resistor, and a positive temperature coefficient resistor (PTCR).

8. A dielectric ceramic composition comprising $(1-x)BaTiO_3-x(Na_{1-y}K_y)NbO_3$, where 0.03≤x≤0.5 and 0.3≤y≤0.7, having a room temperature permittivity of 1500 or more, a temperature coefficient of capacitance at 150° C. between −15% and +15%, and a withstand voltage at 150° C. of 50 V/μm or more.

9. The dielectric ceramic composition of claim 8, wherein the room temperature permittivity is 2000 or more.

10. The dielectric ceramic composition of claim 8, wherein the temperature coefficient of capacitance at 150° C. is between −10% and +10%.

11. The dielectric ceramic composition of claim 8, wherein the withstand voltage at 150° C. is 60 V/μm or more.

12. An electrical device comprising the dielectric ceramic composition of claim 2.

13. The electrical device of claim 12, wherein the electrical device is one selected from the group consisting of a multi-layered ceramic capacitor, a piezoelectric element, a chip inductor, a chip varistor, a chip resistor, and a positive temperature coefficient resistor (PTCR).

14. An electrical device comprising the dielectric ceramic composition of claim 3.

15. The electrical device of claim 14, wherein the electrical device is one selected from the group consisting of a multi-layered ceramic capacitor, a piezoelectric element, a chip inductor, a chip varistor, a chip resistor, and a positive temperature coefficient resistor (PTCR).

16. An electrical device comprising the dielectric ceramic composition of claim 4.

17. The electrical device of claim 16, wherein the electrical device is one selected from the group consisting of a multi-layered ceramic capacitor, a piezoelectric element, a chip inductor, a chip varistor, a chip resistor, and a positive temperature coefficient resistor (PTCR).

18. An electrical device comprising the dielectric ceramic composition of claim 5.

19. The electrical device of claim 18, wherein the electrical device is one selected from the group consisting of a multi-layered ceramic capacitor, a piezoelectric element, a chip inductor, a chip varistor, a chip resistor, and a positive temperature coefficient resistor (PTCR).

* * * * *

UNITED STATES PATENT AND TRADEMARK OFFICE
CERTIFICATE OF CORRECTION

PATENT NO. : 9,601,275 B1  Page 1 of 1
APPLICATION NO. : 14/925481
DATED : March 21, 2017
INVENTOR(S) : Seok-Hyun Yoon et al.

It is certified that error appears in the above-identified patent and that said Letters Patent is hereby corrected as shown below:

On the Title Page

Please insert:
--(30) Foreign Application Priority Data
Nov. 24, 2014 (KR) .................. 10-2014-0164758--

Signed and Sealed this
Twenty-third Day of May, 2017

Michelle K. Lee
*Director of the United States Patent and Trademark Office*